(12) United States Patent
Chen et al.

(10) Patent No.: US 11,741,146 B2
(45) Date of Patent: Aug. 29, 2023

(54) EMBEDDING MULTI-MODAL TIME SERIES AND TEXT DATA

(71) Applicant: NEC Laboratories America, Inc., Princeton, NJ (US)

(72) Inventors: Yuncong Chen, Plainsboro, NJ (US); Dongjin Song, Princeton, NJ (US); Cristian Lumezanu, Princeton Junction, NJ (US); Haifeng Chen, West Windsor, NJ (US); Takehiko Mizoguchi, West Windsor, NJ (US); Xuchao Zhang, Elkridge, MD (US)

(73) Assignee: NEC Corporation

( * ) Notice: Subject to any disclaimer, the term of this patent is extended or adjusted under 35 U.S.C. 154(b) by 173 days.

(21) Appl. No.: 17/370,498

(22) Filed: Jul. 8, 2021

(65) Prior Publication Data

US 2022/0012274 A1 Jan. 13, 2022

Related U.S. Application Data

(60) Provisional application No. 63/050,962, filed on Jul. 13, 2020.

(51) Int. Cl.
*G06F 16/35* (2019.01)
*G06K 9/62* (2022.01)
*G06F 40/169* (2020.01)
*G06N 3/08* (2023.01)
*G06F 18/23* (2023.01)
(Continued)

(52) U.S. Cl.
CPC ........ *G06F 16/355* (2019.01); *G06F 18/2155* (2023.01); *G06F 18/23* (2023.01); *G06F 40/169* (2020.01); *G06N 3/08* (2013.01); *G06V 10/62* (2022.01); *G06V 10/7715* (2022.01); *G06V 10/82* (2022.01)

(58) Field of Classification Search
CPC .... G06V 10/7715; G06V 10/82; G06V 10/62; G06F 40/30; G06F 40/169; G06F 40/216; G06F 16/359; G06F 18/23; G06F 18/2155; G06F 16/355; G06N 3/045; G06N 3/088; G06N 3/08
See application file for complete search history.

(56) References Cited

U.S. PATENT DOCUMENTS

| | | | | |
|---|---|---|---|---|
| 10,437,933 | B1* | 10/2019 | Clifton | G06F 40/216 |
| 2010/0106743 | A1* | 4/2010 | Brunner | G16H 10/60 |
| | | | | 707/E17.014 |

(Continued)

OTHER PUBLICATIONS

Hardoon, David R., et al. "Canonical Correlation Analysis: An Overview with Application to Learning Methods", Neural computation. May 28, 2003, pp. 1-39.

(Continued)

*Primary Examiner* — Etienne P Leroux
(74) *Attorney, Agent, or Firm* — Joseph Kolodka

(57) ABSTRACT

Methods and systems of training and using a neural network model include training a time series embedding model and a text embedding model with unsupervised clustering to translate time series and text, respectively, to a shared latent space. The time series embedding model and the text embedding model are further trained using semi-supervised clustering that samples training data pairs of time series information and associated text for annotation.

15 Claims, 8 Drawing Sheets

(51) Int. Cl.
*G06F 18/214* (2023.01)
*G06V 10/77* (2022.01)
*G06V 10/82* (2022.01)
*G06V 10/62* (2022.01)

(56) References Cited

U.S. PATENT DOCUMENTS

| | | |
|---|---|---|
| 2014/0019119 A1* | 1/2014 | Liu .................. G06F 40/10 704/9 |
| 2017/0132523 A1* | 5/2017 | Zhang ................. G06N 5/047 |
| 2019/0042881 A1* | 2/2019 | Lopatka ............... G10L 25/24 |
| 2019/0171644 A1* | 6/2019 | Xu .................... G06F 11/08 |
| 2020/0285897 A1* | 9/2020 | Shah ................. G06F 18/214 |
| 2023/0023646 A1* | 1/2023 | Xu ................... G06F 11/3419 |

OTHER PUBLICATIONS

Andrew, Galen, et al. "Deep Canonical Correlation Analysis", International Conference on Machine Learning, PMLR. May 26, 2013, pp. 1247-1255.

Vaswani, Ashish, et al. "Attention is All You Need", InAdvances in neural information processing systems. Dec. 4, 2017, pp. 1-11.

Wu, Chao-Yuan, et al. "Sampling Matters in Deep Embedding Learning", In Proceedings of the IEEE International Conference on Computer Vision, Oct. 2017, pp. 2840-2848.

Xiong, Sicheng. "Active Learning of Constraints for Semi-Supervised Clustering", IEEE Transactions on Knowledge and Data Engineering. Jan. 25, 2013, pp. 1-53.

Basu, Sugato, et al. "Active Semi-Supervision for Pairwise Constrained Clustering", InProceedings of the 2004 SIAM International Conference on Data Mining, Society for Industrial and Applied Mathematics. Apr. 22, 2004, pp. 333-344.

Zhu, Xiaojin, et al. "Semi-Supervised Learning Using Gaussian Fields and Harmonic Functions", In Proceedings of the 20th International conference on Machine learning (ICML-03), vol. 2. Sep. 16, 2003, pp. 1-8.

* cited by examiner

EMBEDDING MULTI-MODAL TIME SERIES AND TEXT DATA

RELATED APPLICATION INFORMATION

This application claims priority to 63/050,962, filed on Jul. 13, 2020, incorporated herein by reference in its entirety.

BACKGROUND

Technical Field

The present invention relates to machine learning with time series data, and, more particularly, to learning correspondences between time series information and textual descriptions.

Description of the Related Art

Time series information from sensors can be used to identify abnormal behavior in a system. However, this information may be difficult to comprehend for a human operator.

SUMMARY

A method for training a neural network includes training a time series embedding model and a text embedding model with unsupervised clustering to translate time series and text, respectively, to a shared latent space. The time series embedding model and the text embedding model are further trained using semi-supervised clustering that samples training data pairs of time series information and associated text for annotation.

A method for querying a time series database includes transforming a query to an embedded vector in a multi-modal shared latent space that encodes time series information and textual information. A feature vector is identified in the multi-modal shared latent space, stored in a time series dataspace, that matches the embedded vector, and that is associated with a data type complementary to the query. Data associated with the identified feature vector is returned, responsive to the query.

A system for training a neural network includes a hardware processor and a memory that stores a computer program product. When executed by the hardware processor, the computer program product causes the hardware processor to train a time series embedding model and a text embedding model using unsupervised clustering to translate time series and text, respectively, to a multi-modal shared latent space; to train the time series embedding model and the text embedding model further using semi-supervised clustering that samples training data pairs of time series information and associated text for annotation; to transform a query to an embedded vector in the multi-modal shared latent space that encodes time series information and textual information; to identify a feature vector in the multi-modal shared latent space, stored in a time series dataspace, that matches the embedded vector, and that is associated with a data type complementary to the query; and to return data associated with the identified feature vector, responsive to the query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Time series information can be generated by sensors in a cyber-physical system, and can represent large amounts of data. Using machine learning, this time series information can be used to identify normal and abnormal behavior of the system. However, while time series provides a rich source of information about the functioning of the system, it is not generally directly interpretable by human operators.

In addition to the time series information that can be accumulated, human operators may generate textual descriptions of the operation of the system. For example, when something goes wrong (e.g., during abnormal behavior of the system), a human operator may address the problem and generate textual information that describes the problem and its solution. This textual information may then be associated with the time series information, for example by identifying a correspondence between the two kinds of data in a training dataset.

By training a machine learning model using this multi-modal training dataset, the model may be used to provide a textual description of identified abnormality. In this manner, a system can automatically explain the state of the system, based on measured time series information. In addition, the relationship between text and time series can be used to provide text searches of time series information, with a natural language query being used to identify associated time series segments.

Figure 1:
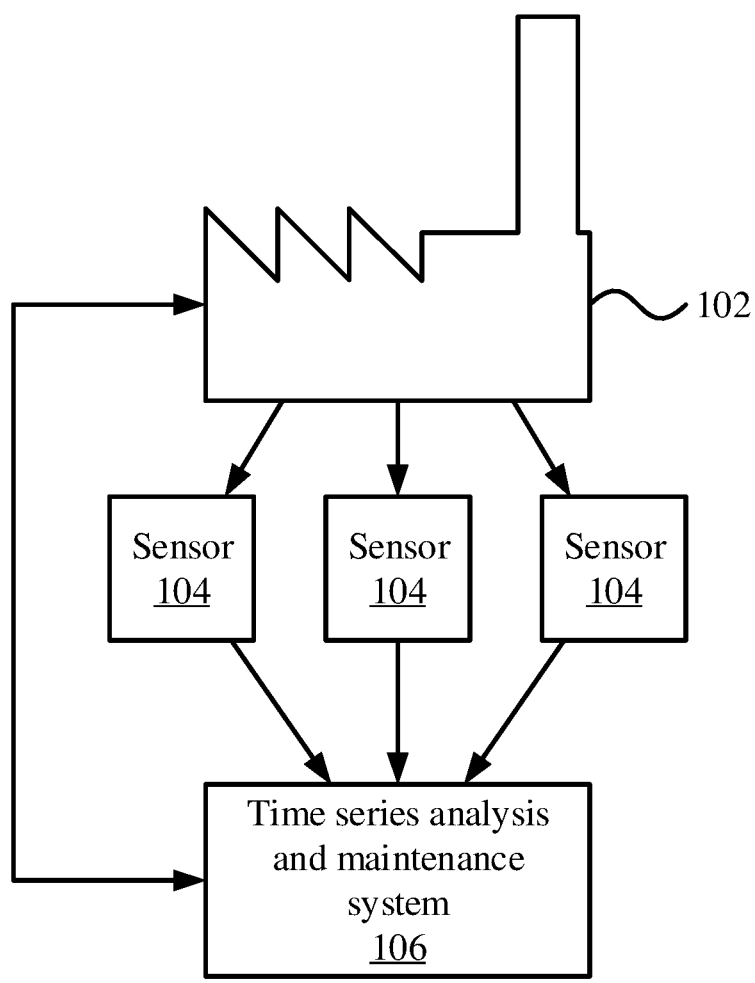
FIG. 1 is a diagram of a cyber-physical system that includes sensors, generating time series data which can be used to classify the behavior of the cyber-physical system, in accordance with an embodiment of the present invention.

Referring now in detail to the figures in which like numerals represent the same or similar elements and initially to FIG. 1, a time series analysis and maintenance system 106 in the context of a monitored system 102 is shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats. In some cases, the sensors 104 may be software programs that monitor the state of a computer system and generate logging information.

In particular embodiments, the sensor data 104 can also include a KPI measurement. In some embodiments, the KPI measurement may be the result of an inspection of a physical output of the monitored system 102, or can represent a determination of a quality of the physical output by any appropriate measurement or characteristic.

The sensors 104 may transmit the logged sensor information to an anomaly maintenance system 106 by any appropriate communications medium and protocol, including wireless and wired communications. The maintenance system 106 can, for example, identify abnormal behavior by monitoring the multivariate time series that are generated by the sensors 104. Once anomalous behavior has been detected, the maintenance system 106 communicates with a system control unit to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By identifying the particular sensors 104 that are associated with the anomalous classification, the amount of time needed to isolate a problem can be decreased.

For example, the monitored system 102 may be a power plant, with sensors 104 being deployed at various positions within the facility, each collecting time series data that characterizes the status of the power generation process. The time series data is transmitted to the maintenance system 106, which can identify when the time series data indicates abnormal operation.

Over the course of time, the time series information that is collected by the sensors 104 may be annotated by domain experts. For example, after a system failure, an operator may write notes describing characteristics of the time series signal, causes, solutions, and expected future states. Such information may include references to particular segments of time series data, for example identifying particular sensors 104 during particular periods of time. Large amounts of such information may be accumulated during the normal operation and maintenance of the system. This information may form the basis of a multimodal training dataset that fuses time series information and descriptive text information.

To accomplish this, the time series segments and the text comments may be transformed into points in a common latent space, such that examples of the same class and examples in the same series/text pair are close together in the latent space. Cross-modal retrieval may be performed by finding nearest neighbors of a query in this common space. Concept discovery may be performed by clustering data points in the latent space. In this manner, human-sourced knowledge may guide the learning, while manual labeling can be reduced without sacrificing performance.

Figure 2:
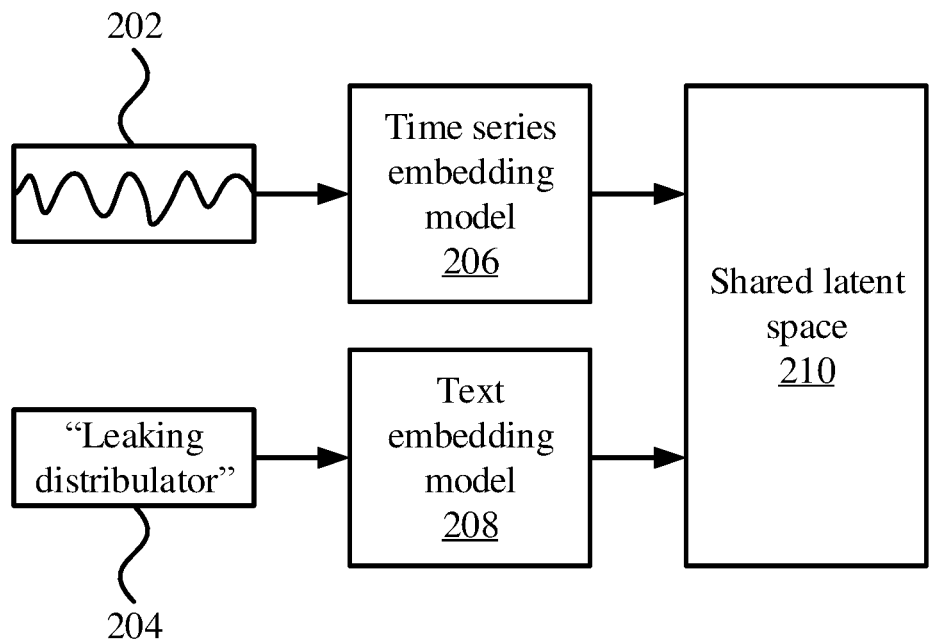
FIG. 2 is a diagram showing the relationship between a time series embedding model, a text embedding model, and a shared latent space, in accordance with an embodiment of the present invention.

Referring now to FIG. 2, a process for embedding multimodal training data is shown. Two types of data are shown, in this example including time series data 202 and textual data 204. In some examples, the textual data 204 may be entered by a human operator to describe the time series data 202.

A time series embedding model 206 is trained to convert the input time series 202 to a vector in a shared latent space 210. A text embedding model 208 is similarly trained to convert the input textual data 204 to a vector in the same shared latent space 210. By training the respective models to embed associated textual data 204 and time series data 202 similarly, the shared latent space 210 can subsequently be used to identify textual descriptions on the basis of time series information and to identify time series information on the basis of textual descriptions.

To build on the relatively noisy structure that can be obtained from clustering by adjacency in the shared latent space 210, semi-supervised clustering with limited label data can be used, with adaptive sampling of the next most informative examples to query annotators for further input. Based on estimated clustering, the representation may be further improved by supervised techniques, increasing the margins between estimated clusters.

Figure 3:
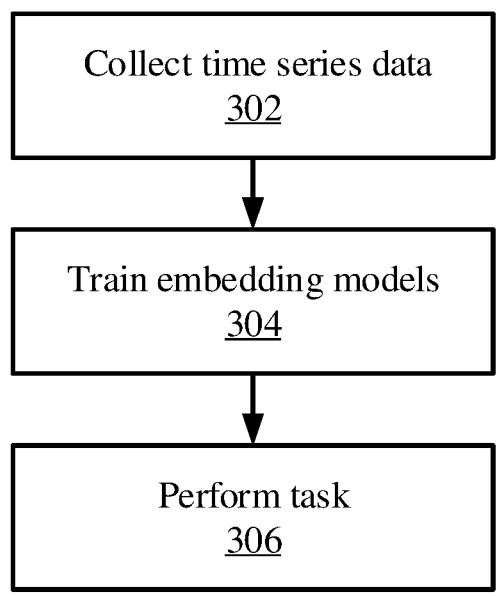
FIG. 3 is a block/flow diagram of a method for training, deploying, and using a set of embedding models for a shared latent space, in accordance with an embodiment of the present invention.

Referring now to FIG. 3, a method for performing a task using time series is shown. Block 302 collects time series data from the sensors 104. This information may or may not include annotations by human operators. Block 304 then trains the embedding models 206 and 208. The training may, as described in greater detail below, include an unsupervised stage and a semi-supervised stage. The unsupervised stage may train a set of encoders to produce reasonable representations of input time series information and textual data without the benefit of class labels. The semi-supervised stage may alternate between querying pair-relations from human operators and semi-supervised representation learning.

Two exemplary adaptive sampling strategies are described below for sampling during the training. A first strategy minimizes a Bayesian risk, while a second strategy maximizes uncertainty. During learning, a combination of a margin-based loss and deep canonical correlation analysis (CCA) regularization is minimized.

Block 306 performs a task using the trained models. For example, such a task may include natural language querying to identify matching time series data segments. Such queries may optionally also use an exemplary time series segment. Another task may include using a time series segment as a query and generating a natural language explanation in response. Queries may be searched within the shared latent space 210 using a nearest neighbor-based retrieval.

Figure 4:
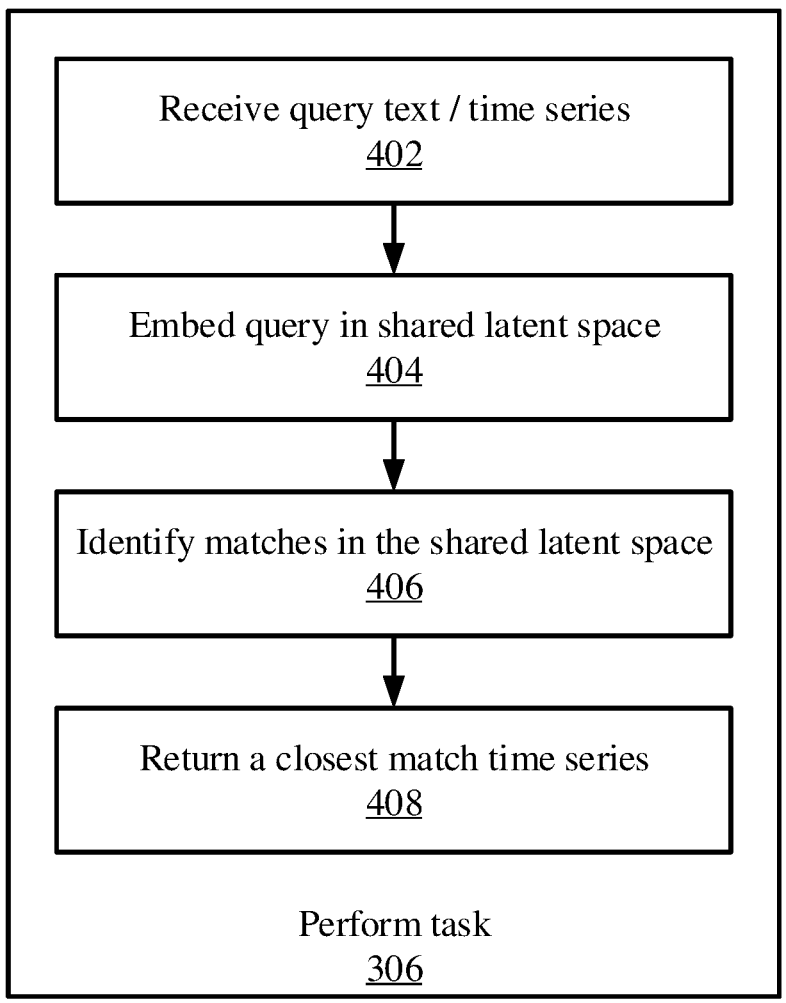
FIG. 4 is a block/flow diagram of a method for performing a query task using time series information and associated text information in a shared latent space, in accordance with an embodiment of the present invention.

Referring now to FIG. 4, additional detail on an exemplary task of block 306 is shown, where a database of stored time series segments is searched. Block 402 receives a query that may include natural text and may also include an example time series segment. For example, an operator may compose a query based on recent operational data from the sensors 104 and may describe the operational state of the system 102, to obtain corresponding historical time series information.

Block 404 embeds the query in the shared latent space 210. For a text-only query, the text embedding model 208 may be used alone. For a combined text/time series query, both the text embedding model 208 and the time series embedding model 206 may be both be used to generate respective vectors within the shared latent space 210. Block 406 identifies one or more matches within the shared latent space, for example by identifying the nearest neighbors to the embedded query vector(s). Block 408 then returns one or more of the matching time series, for example a nearest neighbor.

Figure 5:
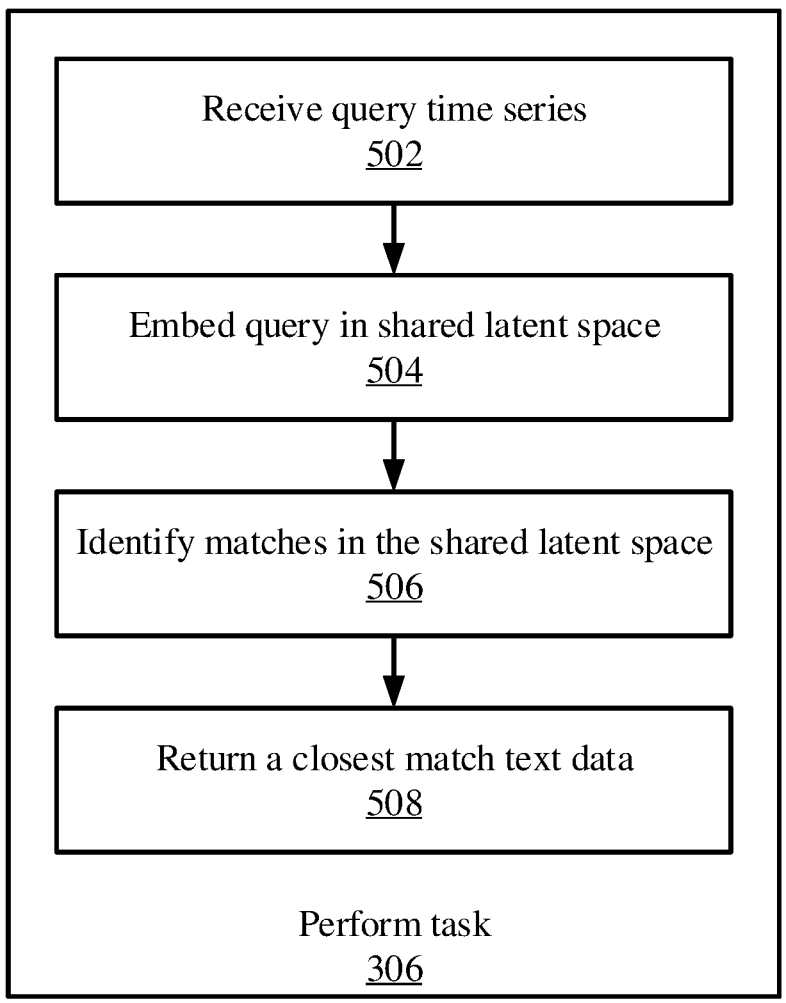
FIG. 5 is a block/flow diagram of a method for performing a query task using time series information and associated text information in a shared latent space, in accordance with an embodiment of the present invention.

Referring now to FIG. 5, additional detail on an exemplary task of block 306 is shown, where a database of stored time series segments is searched. Block 502 receives a query that may include an example time series segment. For example, an operator may submit a time series that represents the operation of the system 102, to obtain a textual explanation of the current state of the system 102.

Block 504 embeds the query in the shared latent space 210, for example using the time series embedding model 206, to generate a vector within the shared latent space 210. Block 506 identifies one or more matches within the shared latent space 210, for example by identifying the nearest neighbors to the embedded query vector. Block 508 then returns one or more matching texts, such as a nearest neighbor. These texts are provided to the operator to explain the query time series segment.

Figure 6:
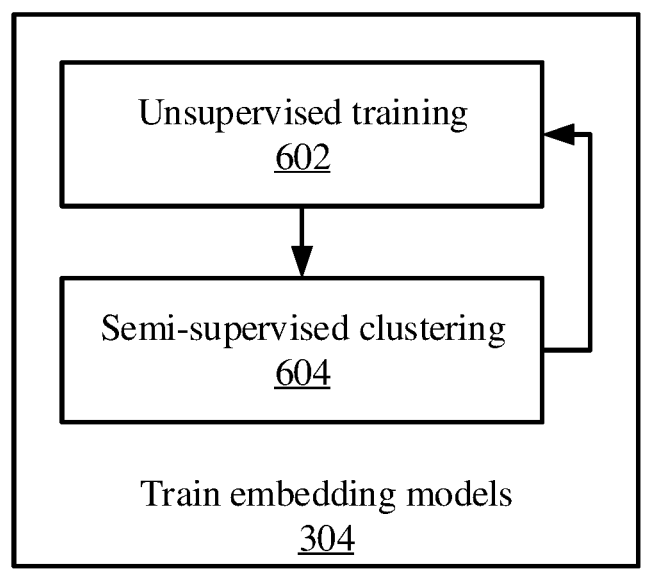
FIG. 6 is a block/flow diagram of a method for training embedding models for a shared latent space, in accordance with an embodiment of the present invention.

Referring now to FIG. 6, additional detail on the training of block 304 is shown, including an unsupervised training stage 602 and a semi-supervised clustering stage 604. Training 304 uses a dataset of paired data, where each pair includes a time series segment and a text comment (e.g., one to three sentences). The number of data pairs is indicated here in as n, and the $i^{th}$ data pair is indicated by $(x^{(i)}, y^{(i)})$, where $x^{(i)}$ is the $i^{th}$ time series segment (alternatively written as $x_i$) and where $y^{(i)}$ is the $i^{th}$ text comment (alternatively written as $y_i$). Each pair may be associated with a class label $c^{(i)} \in [1, \ldots, C]$, which may not be known at the beginning of training. For example, in the context of financial data, the class label may indicate chart patterns such as "ascending triangle" or "descending channel."

Training 304 determines parameters for the time series embedding model 206 (indicated herein as f) and the text embedding model 208 (indicated herein as g). The time series encoder f takes a time series segment as input and outputs a feature vector, with a feature vector of the $i^{th}$ time series being indicated by $h_1^{(i)} = f(x^{(i)})$. The time series embedding model 206 may be implemented as an encoder, for example trained as a first part of an autoencoder neural network. Another exemplary architecture of the time series embedding model 206 may include dilated convolution layers, or a temporal convolution net. Any appropriate architecture may be selected for the time series embedding model 206 to convert a multivariate time series to a feature vector.

Similarly, the text encoder g takes a tokenized text comment as input and outputs a feature vector. The feature vector of the $i^{th}$ text example is indicated herein as $h_2^{(i)} = g(y^{(i)})$. The text embedding model 208 may be implemented as an encoder, for example trained as a first part of an autoencoder neural network. Another exemplary architecture for the text embedding model 208 may include a series of convolutional layers, followed by a transformer network. The convolutional layers capture local context, such as multi-word phrases, while the transformer network encodes longer-term dependencies in the sequence. The time series feature matrix is indicated herein as $H_X \in \mathbb{R}^{n \times d_1}$ and the text feature matrix is indicated herein as $H_Y \in \mathbb{R}^{n \times d_2}$, where the $i^{th}$ row of each is $h_1^{(i)}$ and $h_2^{(i)}$, respectively.

During the unsupervised training stage 602, the encoders are trained in an unsupervised manner, for example using deep CCA. After that, the semi-supervised clustering stage 604 may train the encoders further using a semi-supervised loss, based on class equivalence constraints provided by a human operator to a relatively small set of data pairs.

During unsupervised training 602, the weights of the time series embedding model 206 and the text embedding model 208 may be initialized, for example setting all values to zero or setting the values randomly. Time series segments and text comments from the data pairs are then passed through the respective time series embedding model 206 and the text embedding model 208 to obtain feature vectors. Covariance matrices may then be determined as:

$$\sum_{XX} = \frac{H_X^T H_X}{n-1} + r_1 I$$

$$\sum_{YY} = \frac{H_Y^T H_Y}{n-1} + r_2 I$$

$$\sum_{XY} = \frac{1}{n-1} H_X^T H_Y$$

where $r_1$ and $r_2$ are hyperparameters, for example valued at 0.1.

The covariance matrix S may then be determined as:

$$S = \sum_{XX}^{-\frac{1}{2}} \sum_{XY} \sum_{YY}^{-\frac{1}{2}}$$

A singular value decomposition may then be performed on S as:

$$U, \Lambda, V^T = SVD(S)$$

where U is a $d_1 \times d_1$ orthogonal matrix, $\Lambda$ is a $d_1 \times d_2$ diagonal matrix, and $V^T$ is the transpose of a $d_2 \times d_2$ orthogonal matrix generated as outputs of the singular value decomposition.

A total correlation may be determined by summing all singular values, which are diagonal elements of $\Lambda$:

$$c = \sum_{i=1}^{min(d_1, d_2)} \Lambda_{ii}$$

The gradient of the total correlation may then be determined with respect to parameters of both encoders. The parameters of each encoder may then be updated using stochastic gradient descent.

The parameters generated by unsupervised training 602 may be further improved by querying a human annotator in the semi-supervised clustering 604. This query may ask for, e.g., "must-link" and "cannot-link" constraints between pairs of examples. The query may ask about whether two time series segments, two texts, or one time series segment and one text belong to the same group. This may be distinct from querying which cluster an example should be assigned to. The answer to such a query may be obtained after querying an example against every cluster until a must-link condition is found. The unsupervised training 602 and the semi-supervised clustering 604 may be iteratively repeated until a convergence threshold has been reached.

Figure 7:
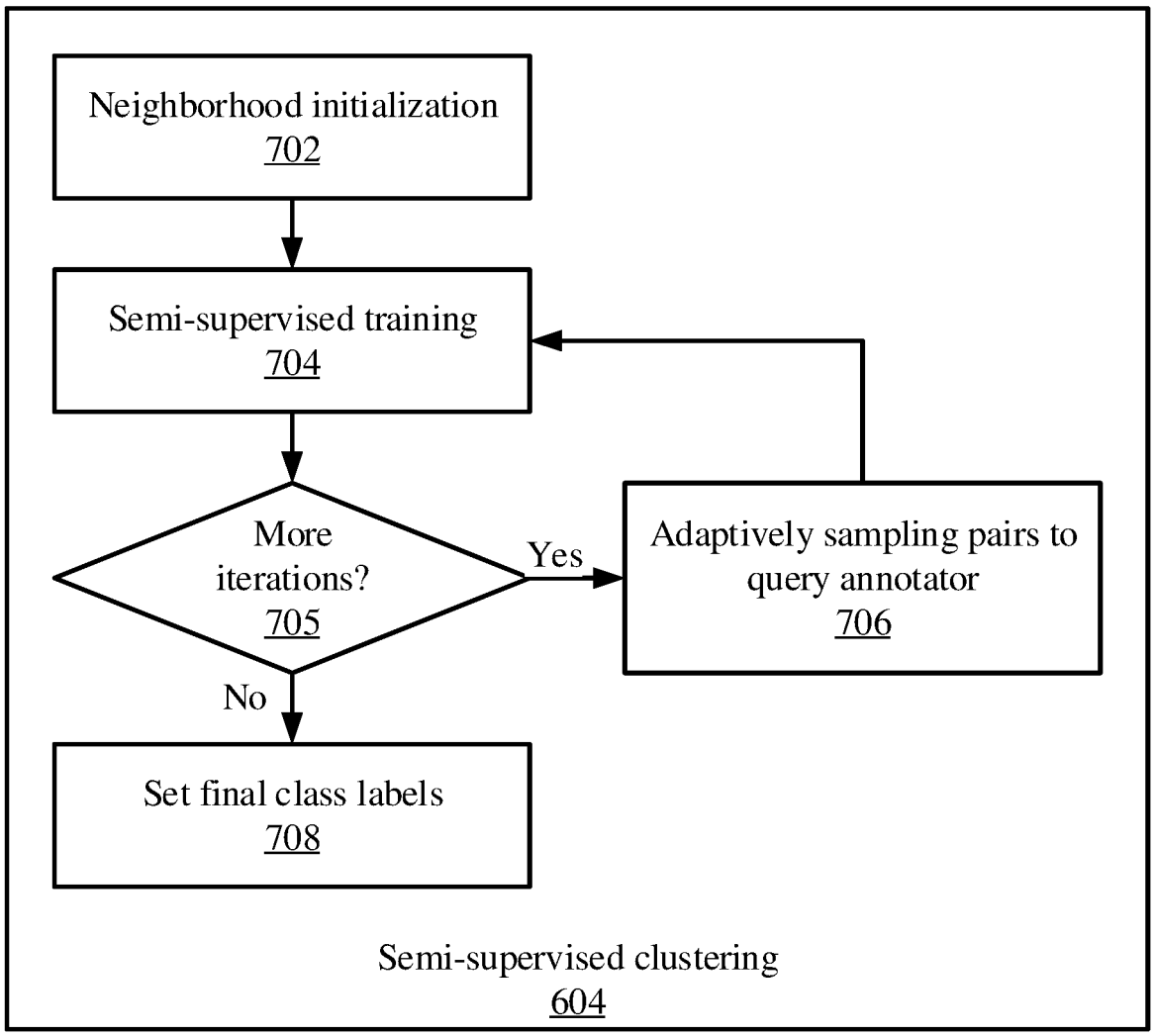
FIG. 7 is a block/flow diagram of a method for semi-supervised clustering using adaptive sampling to select training data pairs for annotation, in accordance with an embodiment of the present invention.

Referring now to FIG. 7, additional detail on semi-supervised clustering 604 is shown. Block 702 may be performed first, to obtain an initial batch of labeled examples. Blocks 704 and 706 alternate between active sampling and semi-supervised training, until block 705 determines that a maximum number of iterations has been reached. At block 708, final class labels are set.

In neighborhood initialization 702, initial queries are made to an annotator to establish disjoint neighborhoods that cover every cluster as quickly as possible. For example, a farthest-first exploration strategy may be used to identify the queries. Starting from a single neighborhood having a random example, block 702 selects examples that are farthest from any known neighborhoods. The example's relation to each neighborhood is queried in an exemplary order of increasing distance. Once a "must-link" condition is provided by the annotator, the example is added to the respective neighborhood. If no "must-link" condition is discovered after all of the neighborhoods are tested, block 702 may create a new neighborhood with the selected example.

Once a set of minimal neighborhoods is initialized in block 702, blocks 704 and 706 adaptively query unlabeled examples that will be effective for learning the embedding. The sampling of block 706 is interleaved with semi-supervised training 704, which improves an affinity graph, which in turn allows semi-supervised clustering 604 to produce better posterior estimates. Two active sampling strategies are described below, using the estimated posteriors. One strategy prioritizes the most uncertain examples measured through the entropy of the posterior, while the other strategy minimizes an estimated Bayesian risk.

Figure 8:
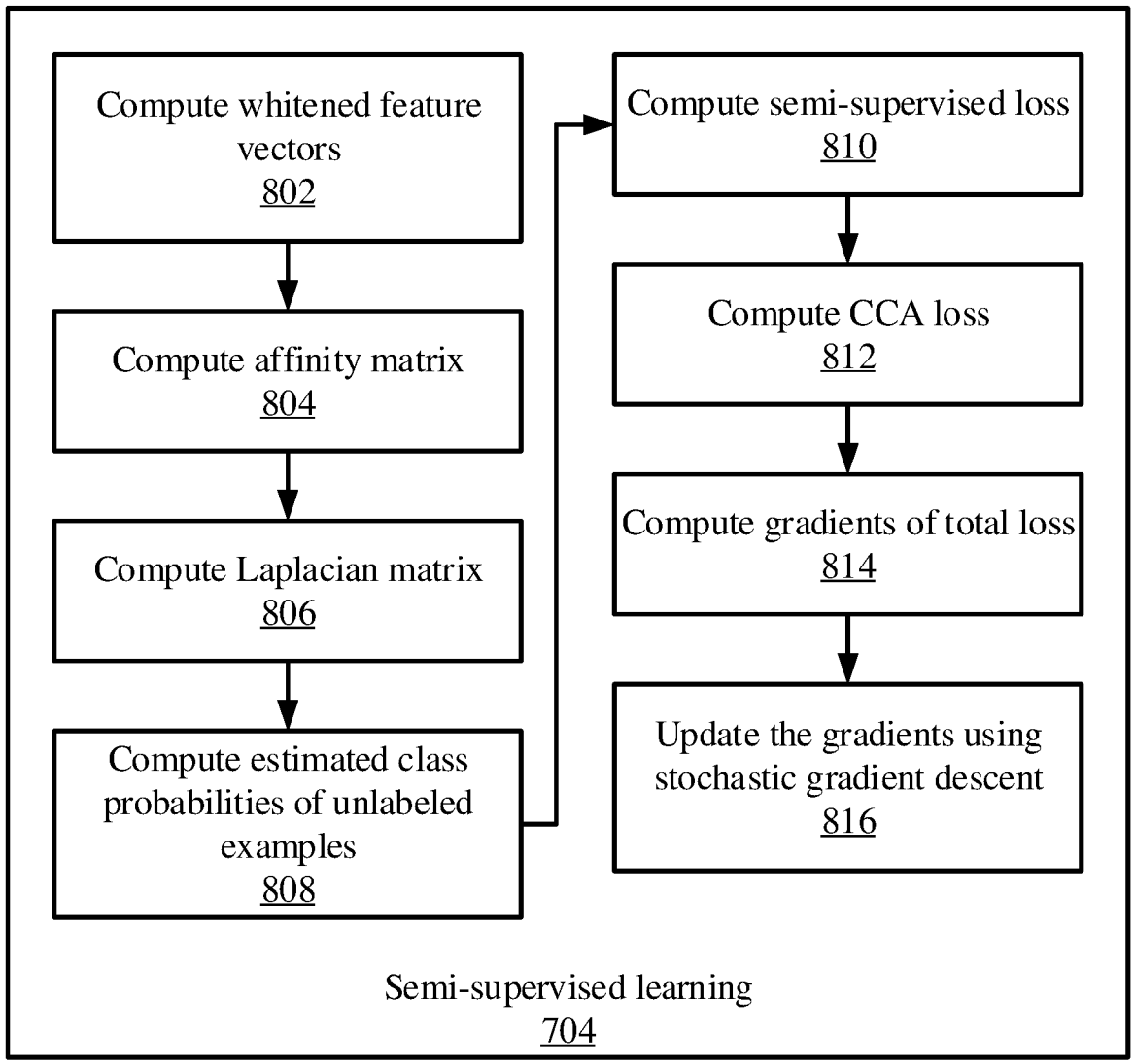
FIG. 8 is a block/flow diagram of a method for semi-supervised learning, in accordance with an embodiment of the present invention.

Referring now to FIG. 8, additional detail on the semi-supervised training 704 is shown. Using a set of known must-link and cannot-link constraints between pairs of examples, a matrix of pairwise relations may be denoted as $C \in \mathbb{R}^{n \times n}$, where $C_{ij}=1$ if (i, j) is a must-link constraint, $C_{ij}=-1$ if it is a cannot-link constraint, and 0 if unknown. The number of classes is indicated as m. The matrix $Y \in \mathbb{R}^{n \times m}$ may be determined from the known neighborhoods, where $Y_{ic}=1$ if example i is known to be in class c and $Y_{ic}=0$ if example i is known not to be in class c, or is unlabeled. The embedding of a time series $x^{(i)}$ and a text $y^{(i)}$ may be expressed as $e_i^1 = U^T f(x^{(i)})$ and $e_i^2 = V^T g(y^{(i)})$, respectively.

Block 802 whitens the feature vectors, for example using the covariance matrices $\Sigma_{XX}$, $\Sigma_{YY}$, U, and V, which are singular value decompositions of S, as described above. These whitened feature vectors are used during testing for cross-modal retrieval, as described below. The whitened time series feature matrix is indicated as $Z_1$, where the $i^{th}$ row is the whitened feature vector $f'(x^{(i)})$ for the $i^{th}$ training time series example $x^{(i)}$, determined by:

$$f'(x^{(i)}) = f(x^{(i)})^T \sum_{XX}^{-\frac{1}{2}} U$$

The whitened text feature matrix is indicated as $Z_2$, where the $i^{th}$ row is the whitened feature vector $g'(y^{(i)})$ for the $i^{th}$ training text sample $y^{(i)}$, determined by:

$$g'(y^{(i)}) = g(y^{(i)})^T \sum_{YY}^{-\frac{1}{2}} V$$

The whitened matrices $Z_1$ and $Z_2$ may be determined directly by transforming the feature matrices $H_X$ and $H_Y$, as:

$$Z_1 = H_X \sum_{XX}^{-\frac{1}{2}} U$$

$$Z_2 = H_Y \sum_{XX}^{-\frac{1}{2}} V$$

The whitened feature vectors for the training time series segments, and those of the training texts, may be stored in a feature vector database, which may be used for cross-modal retrieval.

An affinity or adjacency matrix $W \in \mathbb{R}^{n \times n}$ may be determined by block 804, where $W_{ij}$ measures the affinity between examples i and j. Graph-regularized semi-supervised clustering may be used to infer the cluster assignment of unlabeled instances. The term u indicates a list of indices of all unlabeled examples, and l indicates a list of all labeled examples. The term $F_i \in \mathbb{R}^C$ is a class probability vector of example i. An objective function may then be defined to ensure that a predictor is smooth with respect to the graph, while matching known labels on labeled examples:

$$\min_F \frac{1}{2} \sum_{i,j=1}^n \|F_i - F_j\|_2 W_{ij} + \mu \sum_{i \in l} \|F_i - Y_i\|^2$$

where $\mu$ is a weight parameter large enough to ensure class consistency of labeled data.

The objective function may be optimized in a closed form. Block 806 determines a Laplacian matrix L=D−W, where D is the diagonal degree matrix, with $D_{ii} = \Sigma_j W_{ij}$. The optimal $F_u$ for the unlabeled examples can be determined in block 808 as:

$$F_u = L_{uu}^{-1} W_{ul} Y_l$$

where $L_{uu} \in \mathbb{R}^{|u| \times |u|}$ is the submatrix of L corresponding to the unlabeled examples, and where $W_{ul} \in \mathbb{R}^{|u| \times |l|}$ is the submatrix of W with rows corresponding to unlabeled examples and columns to labeled examples. Based on the probability vectors, an approximated relation matric $\hat{C}$ can be determined as:

$$\hat{C} = 2FF^T - 1$$

One way to determine the affinity matrix $W_{ij}$ in block 804 is to use radical-basis functions such as a Gaussian kernel:

$$(W_\sigma)_{ij} = \frac{1}{2} \sum_{v=1,2} \frac{1}{Z} \exp\left(-\frac{\|e_i^v - e_j^v\|^2}{\sigma^2}\right)$$

where σ is a bandwidth parameter that determines the influence radius of each example. 6 Alternatives include using a k-nearest neighbor graph, where $W_{ij}=1$ if and only if the example j is among the k nearest neighbors of example i, and $W_{ij}=0$ otherwise.

With the approximate pairwise relation given by Ĉ, the encoders may be trained to enforce margin between different clusters, to improve retrieval accuracy. This may be captured in block 810 using a margin-based loss function:

$$\mathcal{L}_{sup} = \frac{1}{|\hat{C}|} \sum_{v=1,2} \sum_{i,j} \max(\alpha + \hat{C}_{ij}(\|e_i^v - e_j^v\| - \beta_i), 0)$$

where α and β determine the margin. This loss function $\mathcal{L}_{sup}$ encourages positive examples to example I to be within a distance of β−α, and all negative examples to be father than β+α. Since different clusters may have different internal diversity, separate values $\beta_i$ may be learned for each example, e.g., using a multi-layer perceptron neural network structure, which may have a similar effect as a triplet loss, in that the margin is example-specific, but provides faster computation, as the summation involves pairs, rather than triplets.

Block 812 determine a CCA loss $\mathcal{L}_{CCA}$, with block 814 finding the total loss function: $\mathcal{L} = \mathcal{L}_{sup} + \eta \mathcal{L}_{CCA}$, where η is a weight parameter. Block 816 optimizes the total loss function $\mathcal{L}$ using a stochastic gradient descent for a predetermined number of iterations.

As noted above, the semi-supervised training 704 may alternate with adaptive sampling 706. In one sampling strategy, which seeks to minimize cluster assignment uncertainty, the posterior probability of assigning an unlabeled example i to a cluster c is expressed as $F_{ic}$. The uncertainty of this assignment can be determined as the entropy:

$$ent(x_i) = -\sum_c F_{ic} \log(F_{ic})$$

The example with the highest entropy may be selected as $$k = \underset{i}{\mathrm{argmax}}\, ent(x_i),$$

and a query can be run against an arbitrary example in each known neighborhood in order of decreasing posterior probability to determine the cluster assignment of the example. The labeled information and the affinity structure may thus be used to compute reasonable posterior probabilities.

Another strategy for sampling in block 706 seeks to minimize an expected Bayesian error. This strategy may pick an example that will make other unlabeled examples more confident about their current prediction. This may include any appropriate number of classes, two or greater.

The current class prediction vectors for unlabeled data may be expressed as $F_u \in \mathbb{R}^{|u| \times C}$. If an example i is queried and its label $y_i$ is obtained, this makes it possible to update the prediction vectors to $F_u^{+x_i,y_i}$ as:

$$F_y^{+(x_i,y_i)} = F_u + \left(\frac{(L_{uu}^{-1})_{\cdot i}}{(L_{uu}^{-1})_{ii}}\right)(Y_i - F_i)^T$$

where $Y_i \in \mathbb{R}^C$ is a one-hot vector with a value of 1 only at the $y_i^{th}$ position, and with values of 0 in all other locations, and where the subscript·i indicates the $i^{th}$ column vector of the matrix $L_{uu}^{-1}$.

Since the true value of $y_k$ is not known before querying, the expected prediction vectors $F_i^{+x_k}$ may be determined by taking the expectation over all possible $y_k \in [1, \ldots, C]$. The posterior $P(y_k|x_k)$ can be estimated using the current $F_k$:

$$F_i^{+x_k} = \mathbb{E}_{y_k}\left[F_i^{+(x_k,y_k)}\right] = \sum_{y_k=1}^{c} P(y_k \mid x_k) F_i^{+(x_k,y_k)} = \sum_{y_k=1}^{C} F_{ky_k} F_i^{+(x_k,y_k)}$$

The Bayes-optimal classifier predicts, for any example, the class with the maximum posterior $$pred(F_i) = \underset{c}{\mathrm{argmax}}\, F_{ic},$$

with an associated risk $R(F_u)$ being determined based on the estimated posterior on unlabeled data $F_u$:

$$R(F_u) = \sum_i I[pred(F_i) \neq y_i] P(y_i \mid F_i) = \sum_i 1 - \max_c F_{ic}$$

where I is an indicator function that outputs a value of 1 only if the condition in the brackets is true, and outputs a value of 0 otherwise.

An example may be selected that minimizes $R(F^{+x_k})$, as $$k = \underset{k}{\mathrm{argmin}}\, R(F^{+x_k}).$$

This example may be queried against every known neighborhood, as described above, to determine its assignment.

Between these two strategies, minimizing the cluster assignment uncertainty tends to select an example at the border of the estimated clusters which is the most uncertain about its class assignment, while minimizing the risk selects an example at the outskirts of a relatively dense cluster. A total of m pairwise relationships may be selected using one of these two strategies, and an annotator may be queried to provide an appropriate constraint.

After a certain number of iterations, block 708 determines the final class labels for the training data. At this point, every example has been assigned either a ground-truth label by being actively selected and queried, or has been assigned an estimated label $F_u$ by adopting the class with the largest probability. With these class labels, the dataset can be partitioned into different groups, each representing a distinct semantic concept.

During testing, cross-modal retrieval may be performed using the results of the training phase. These results may include the trained encoders f and g, the training dataset . . . $(x^{(i)}, y^{(i)})$, . . . , and the feature vector database { . . . , $(f'(x^{(i)}), g'(y^{(i)}))$, . . . }. A noted above, different cross-modal tasks may be performed, differing by the modality of the queries and the retrieval targets. At a high level, the tasks may each perform a nearest-neighbor search in the whitened feature space.

For example, following FIG. 5, the query may include a time series segment x. The whitened feature vector $$f'(x) = f(x)^T \sum_{XX}^{-\frac{1}{2}} U$$

may be determined. Then, from the feature vector database, the k text comment examples having whitened features with the smallest Euclidean distances from the vector may be determined, where k may be the number of desired retrieval results, and may be selected by the user. The returned text comment examples are provided to the user as results, indicating relevant textual explanations for the query time series segment.

Following FIG. 6, the query may include a text description y, or both a text description y and a time series segment x. In the first case, the whitened feature vector $$g'(y) = g(y)^T \sum_{YY}^{-\frac{1}{2}} V$$

may be determined. Then, from the feature database, k time-series segments may be identified, having the whitened feature vectors with the smallest Euclidean distance to y. These time series segments are returned to the user as retrieval results, and are semantically close and relevant to the provided description.

If both a text description y and a time series segment x are provided, then whitened feature vectors f'(x) and f'(y) may be determined, as described above. From the feature vector database, n time series segments may be identified having the whitened features that are the nearest neighbors to x, and n time series segments may be identified having the whitened features that are the nearest neighbors to y. The intersection of these two sets of time series segments may be determined. Starting at n=k, if the number of instances in the intersection is smaller than k, then n may be incremented, and new sets may be identified. This iterative process may be repeated until at least k time series segments have been identified, and these k time series segments may be returned as retrieval results, being semantically similar and relevant to both the query time series and the query text description.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 9:
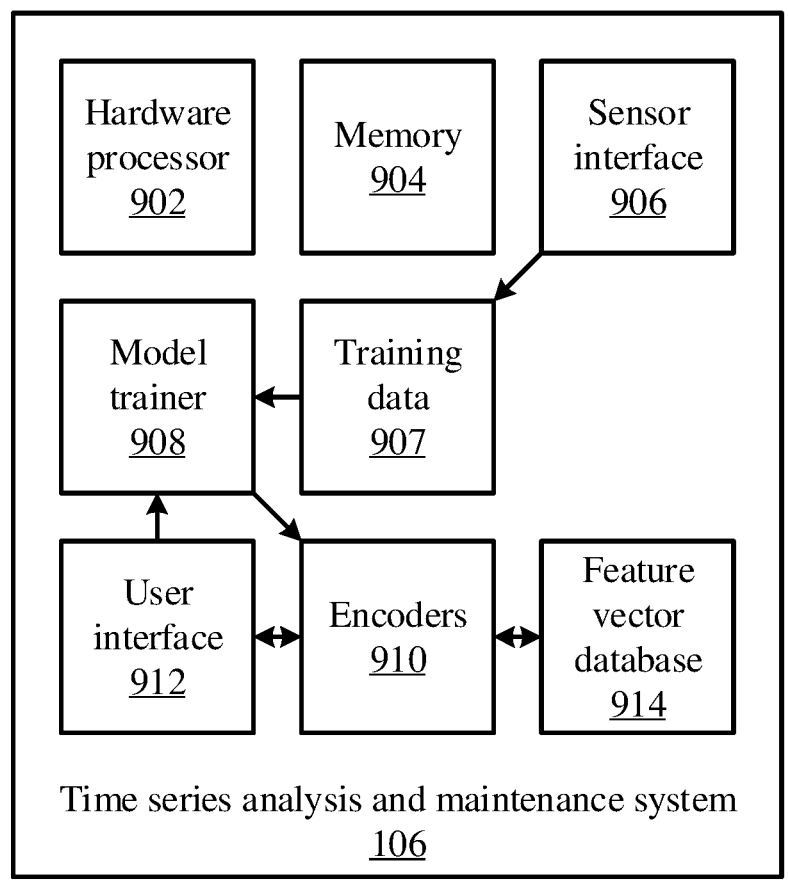
FIG. 9 is a block diagram of a time series analysis and maintenance system, in accordance with an embodiment of the present invention.

Referring now to FIG. 9, additional detail on the time series analysis and maintenance system 106 is shown. The system 106 includes a hardware processor 902 and a memory 904. The system 106 also includes one or more functional modules, which may be implemented as software, stored in the memory 904 and executed by the hardware processor. The functional modules may also be implemented as discrete hardware components, for example in the form of ASICs or FPGAs. A sensor interface 906 communicates with the sensors 104, for example by a dedicated connection or by a general purpose network connection. For example, the sensor interface 906 may communicate with the sensors by any appropriate wired or wireless communications medium or protocol.

The sensor data received from the sensor interface 906 may include time series information, which forms a part of the training data 907. In addition, textual descriptions of such time series information may be received from a human operator via a user interface 912. This multi-modal information, including the time series data and the textual descriptions, may be used by a model trainer 908 to train encoders 910, which may include a time series embedding model 206 and a text embedding model 208.

When a user enters a query at the user interface 912, the encoders 910 translate the query into a vector or vectors in the shared latent space 210. The embedded vectors may be compared to a vector feature database 914 to identify matches, which may then be presented to the user via the user interface 912.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of querying a time series database, comprising:
   transforming a query to an embedded vector in a multi-modal shared latent space that encodes time series info, illation and textual information;
   identifying a feature vector in the multi-modal shared latent space, stored in a time series dataspace, that matches the embedded vector, and that is associated with a data type complementary to the query; and
   returning data associated with the identified feature vector, responsive to the query.

2. The method of claim 1, wherein the query includes a text information, and the feature vector is associated with time series information.

3. The method of claim 2, wherein the associated text describes circumstances relating to the time series segment.

4. The method of claim 2, wherein the query further includes a time series segment.

5. The method of claim 1, wherein the query includes time series information, and the feature vector is associated with text information.

6. The method of claim 1, wherein identifying the feature vector that matches the embedded vector includes identifying a nearest neighbor according to Euclidean distance within in the multi-modal shared latent space.

7. A system for training a neural network, comprising:
   a hardware processor; and
   a memory that stores a computer program product, which, when executed by the hardware processor, causes the hardware processor to:
   train a time series embedding model and a text embedding model using unsupervised clustering to translate time series and text, respectively, to a multi-modal shared latent space;
   train the time series embedding model and the text embedding model further using semi-supervised clustering that samples training data pairs of time series information and associated text for annotation;
   transform a query to an embedded vector in the multi-modal shared latent space that encodes time series information and textual information;
   identifying a feature vector in the multi-modal shared latent space, stored in a time series dataspace, that matches the embedded vector, and that is associated with a data type complementary to the query; and
   returning data associated with the identified feature vector, responsive to the query.

8. The system of claim 7, wherein the training data pairs each include a time series segment and an associated text.

9. The system of claim 8, wherein the associated text of each pair describes circumstances relating to the respective time series segment.

10. The system of claim 8, wherein the computer program product further causes the hardware processor to annotate the sampled pairs to indicate constraints during semi-supervised clustering.

11. The system of claim 10, wherein the constraints are selected from the group consisting of a "must-link" constraint and a "cannot-link" constraint.

12. The system of claim 7, wherein the query includes a text information, and the feature vector is associated with time series information.

13. The system of claim 11, wherein the query further includes a time series segment.

14. The system of claim 7, wherein the query includes time series information, and the feature vector is associated with text information.

15. The system of claim 7, wherein the computer program product further causes the hardware processor to identify a nearest neighbor of the embedded vector according to Euclidean distance within in the multi-modal shared latent space.

* * * * *